US011766743B2

(12) United States Patent
Tamura

(10) Patent No.: US 11,766,743 B2
(45) Date of Patent: Sep. 26, 2023

(54) MULTI-LAYER STEEL PLATE AND RECORDING APPARATUS

(71) Applicant: SEIKO EPSON CORPORATION, Tokyo (JP)

(72) Inventor: Yosaku Tamura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 690 days.

(21) Appl. No.: 16/715,889

(22) Filed: Dec. 16, 2019

(65) Prior Publication Data

US 2020/0189034 A1 Jun. 18, 2020

(30) Foreign Application Priority Data

Dec. 17, 2018 (JP) ................................ 2018-235180

(51) Int. Cl.
*B32B 15/01* (2006.01)
*B41J 2/01* (2006.01)
*B23K 26/22* (2006.01)

(52) U.S. Cl.
CPC ............ *B23K 26/22* (2013.01); *B32B 15/011* (2013.01); *B41J 2/01* (2013.01)

(58) Field of Classification Search
CPC . B32B 15/011; B32B 3/02; Y10T 428/12028; B41J 2/01; B41J 2/135–155
See application file for complete search history.

(56) References Cited

U.S. PATENT DOCUMENTS 4,695,854 A * 9/1987 Cruz-Uribe .......... B41J 2/14233 347/85
4,730,197 A * 3/1988 Raman ................ B41J 2/14233 347/70
2016/0207138 A1* 7/2016 Ikeda ................ B23K 11/0033

FOREIGN PATENT DOCUMENTS

JP H06-182927 7/1994
WO 2011/099593 8/2011

* cited by examiner

*Primary Examiner* — Adam Krupicka
(74) *Attorney, Agent, or Firm* — WORKMAN NYDEGGER

(57) ABSTRACT

A frame as a multi-layer steel plate is a multi-layer steel plate including a plurality of steel plates being stacked, outer peripheries of which have a plurality of sides, in which positions of the plurality of sides of the plurality of steel plates include portions located at identical positions in plan view, the plurality of steel plates are fixed to each other by welding at the plurality of sides located at the identical positions in plan view, and among the plurality of steel plates, at least one of the steel plates is processed into a shape different from a shape of other steel plates.

11 Claims, 8 Drawing Sheets

1
X
Z
Y
82
83
81
8
F
6a
87
85
86
5
502
50
87
84
73
7
72
71
S 1
5
51
41,4
100
42,4
Z
Y
X 51
41,4
5
50
502
501
100
42,4
X
Y
Z 100
112,11,
212,21,
312,31
123,12,
223,22,
323,32
134a
134b
134,13
234,23,
334,33
134c
18,28
60
111,11,
211,21,
311,31
P
113,11,
213,21,
313,31
133a
133b
133,13
133c
233,23,
333,33
14,24,34
18,28
60
132,13
132a
122,12,
222,22,
322,32
10
20
30
114,11,
214,21,
314,31
131,13
131a
121,12,
221,22,
321,32
Z
Y
X 100
10
20
30
113,11
123,12
112,11
14
18
134c
134a
134,13
134b
131,13
131a
121,12
133c
133a
133b
133,13
111,11
132,13
132a
114,11
122,12
223,22
212,21
213,21
28
24
234,23
231,23
221,22
211,21
233,23
232,23
214,21
222,22
323,32
312,31
313,31
38
34
334,33
331,33
321,32
311,31
333,33
332,33
314,31
322,32
Z
Y
X

MULTI-LAYER STEEL PLATE AND RECORDING APPARATUS

The present application is based on, and claims priority from JP Application Serial Number 2018-235180, filed Dec. 17, 2018, the disclosure of which is hereby incorporated by reference herein in its entirety.

BACKGROUND

1. Technical Field

The present disclosure relates to a multi-layer steel plate and a recording apparatus having the multi-layer steel plate.

2. Related Art

To date, as a recording apparatus, for example, an ink jet recording apparatus that performs printing on a medium such as paper or a recording sheet by ejecting ink is known. Inside such a recording apparatus, a head unit such as a line head for ejecting ink is housed, and a metal frame is used to hold the head unit.

To date, high rigidity and high accuracy are required since ink landing accuracy deteriorates if the frame that holds the head unit such as a line head has become twisted or the position of a reference hole or pin has shifted. Therefore, a thick steel plate is used as a base material for the frame in order to ensure high rigidity. In addition, machining is performed to ensure high accuracy. In addition, after processing, surface treatment for preventing rust, or the like, is performed.

JP-A-6-182927 discloses that a composite metal plate composed of three layers including an iron layer on either surface and an aluminum layer at the center is lighter than a steel plate and has the same level of rigidity as a steel plate.

To date, a thick steel plate has been used to ensure high rigidity, but it has been difficult to process complex shapes therewith.

SUMMARY

According to an aspect of the present disclosure, a multi-layer steel plate is a multi-layer steel plate including a plurality of steel plates being stacked, outer peripheries of which have a plurality of sides, in which positions of the plurality of sides of the plurality of steel plates include portions located at identical positions in plan view, the plurality of steel plates are fixed to each other by welding at the plurality of sides located at the identical positions in plan view, and among the plurality of steel plates, at least one of the steel plates is processed into a shape different from a shape of other steel plates.

In the multi-layer steel plate, the plurality of steel plates may be formed with a protruding portion in common disposed outside the sides, and may be fixed to each other by welding at the protruding portion.

In the multi-layer steel plate, the plurality of steel plates may have an opening in common formed therein that penetrates the plurality of steel plates, and the steel plates may be fixed to each other by welding inside the opening.

In the multi-layer steel plate, a portion of the at least one of the steel plates processed into the different shape may have a bent portion bent in a thickness direction.

In the multi-layer steel plate, the bent portion may be bent up to a position identical with a position of the other steel plates in the thickness direction.

In the multi-layer steel plate, the bent portion may have an inclined surface.

In the multi-layer steel plate, except for the at least one of the steel plates, the other steel plates may have a recessed portion formed therein, the recessed portion being disposed inside the sides, and the inclined surface of the at least one of the steel plates may be disposed in the recessed portion.

In the multi-layer steel plate, the bent portion may have a fixing hole disposed therein.

In the multi-layer steel plate, the plurality of steel plates may form a three-layer structure, two layers may have an identical shape, and any one of outer layers may be processed into a shape different from the shape of the other two layers.

In the multi-layer steel plate, the steel plates forming the three-layer structure may have an identical thickness.

According to another aspect of the present disclosure, a recording apparatus includes any one of the above-described multi-layer steel plates, and a recording unit that records on a recording medium, in which the multi-layer steel plate forms a support member that supports the recording unit.

DESCRIPTION OF EXEMPLARY EMBODIMENTS

Hereinafter, the present disclosure will be described in detail based on embodiments. Further, in the following drawings, the scale of each member is illustrated differently from the actual scale so that each member can be recognized.

Embodiment

Figure 1:
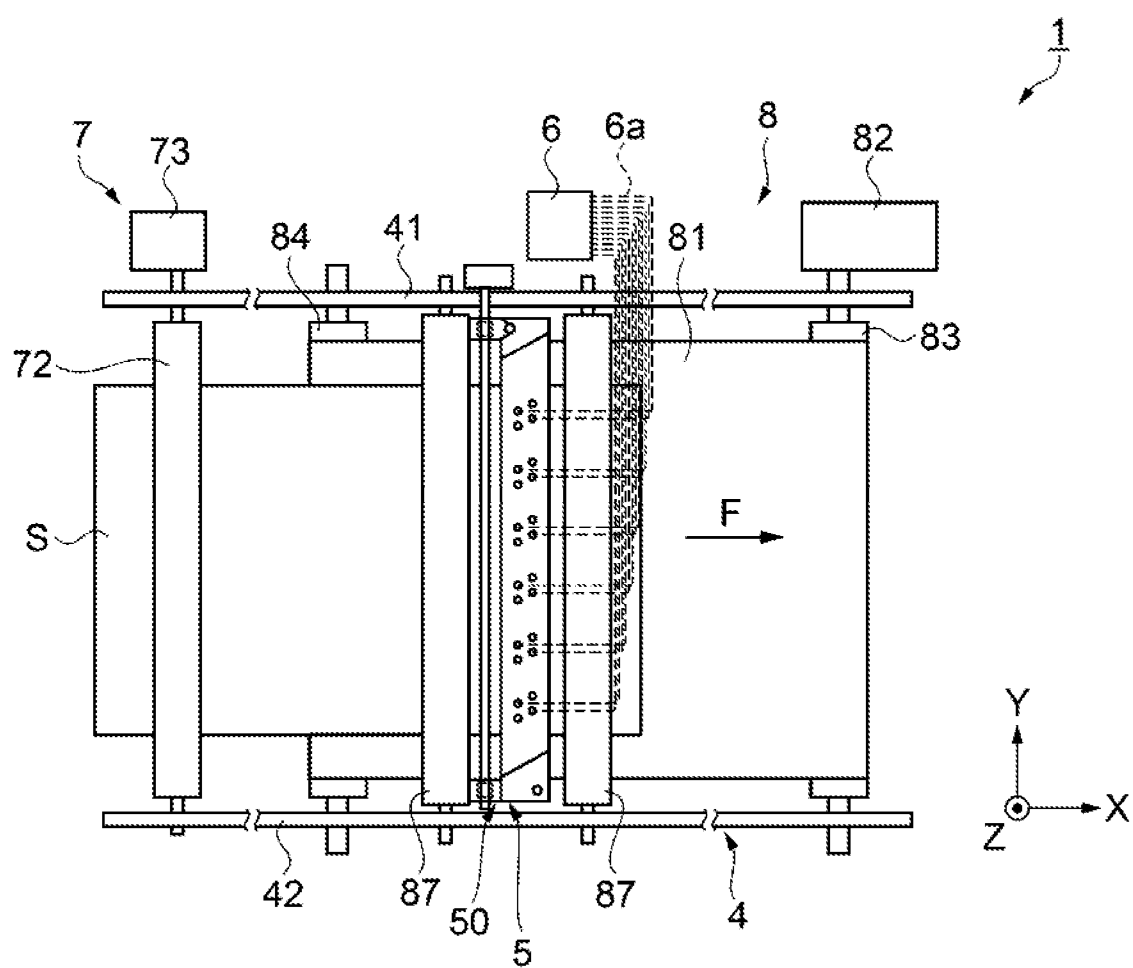
FIG. 1 is a top view illustrating a schematic configuration of a recording apparatus according to an embodiment of the disclosure.
Figure 2:
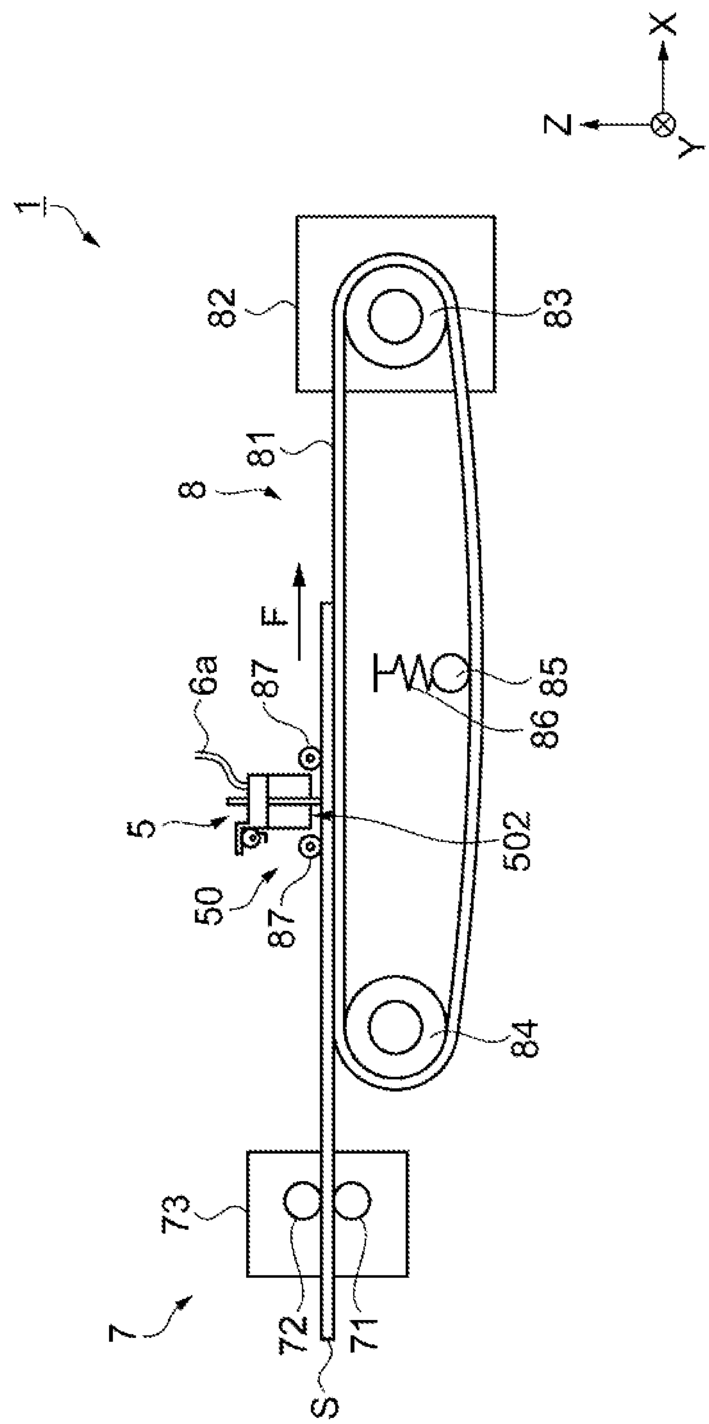
FIG. 2 is a side view illustrating a schematic configuration of the recording apparatus.
Figure 3:
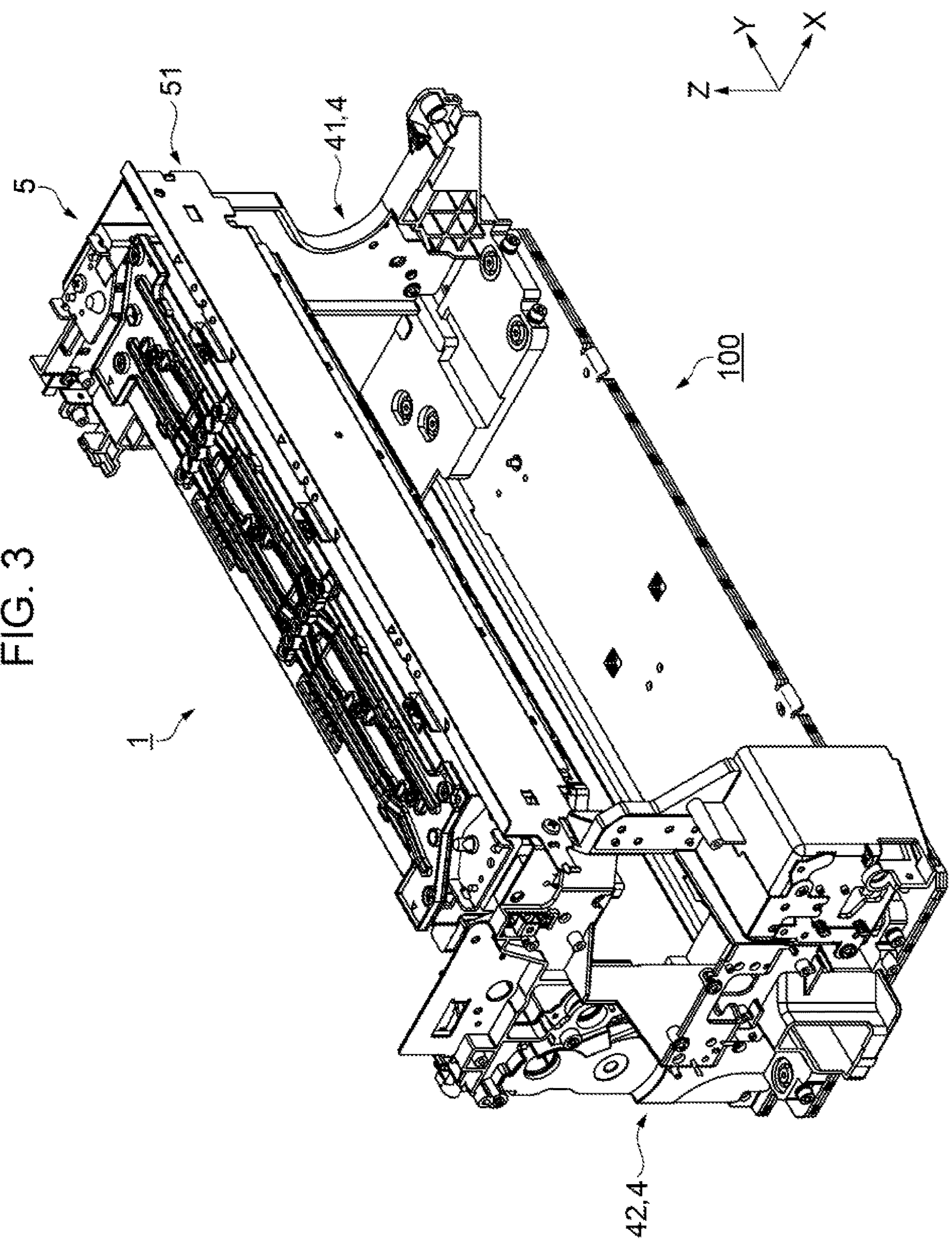
FIG. 3 is a perspective view illustrating a frame and a head unit housed in the recording apparatus.
Figure 4:
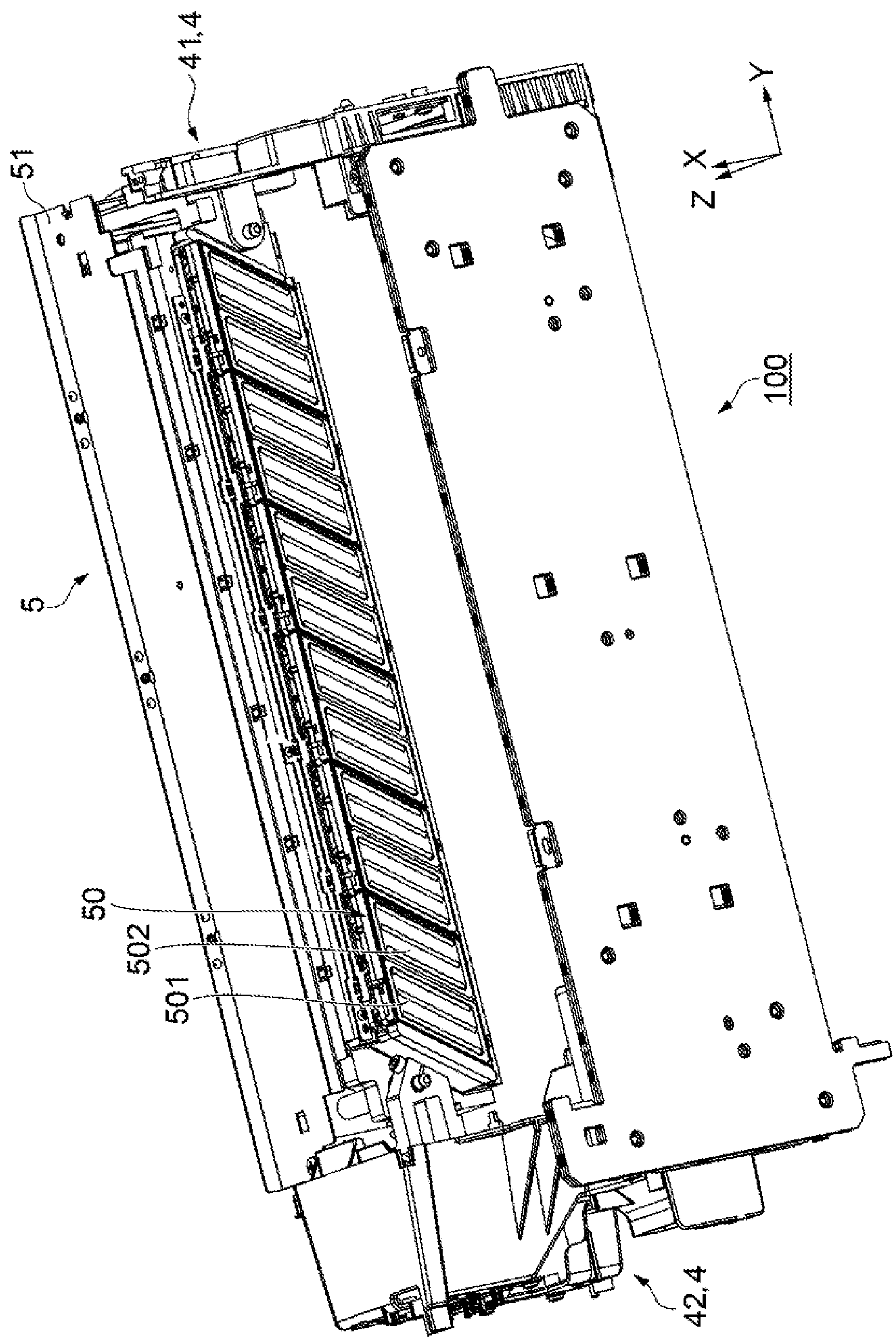
FIG. 4 is a perspective view illustrating the frame and the head unit housed in the recording apparatus.

FIG. 1 is a top view illustrating a schematic configuration of a recording apparatus 1 according to an embodiment of the present disclosure. FIG. 2 is a side view illustrating the schematic configuration of the recording apparatus 1 according to the embodiment of the present disclosure. FIGS. 3 and 4 are perspective views illustrating a frame 100 and a head unit 5 housed in the recording apparatus 1 according to the embodiment of the present disclosure. Further, FIG. 3 is a perspective view of the recording apparatus 1 as viewed from above, and FIG. 4 is a perspective view of the recording apparatus 1 as viewed from below.

As illustrated in FIGS. 1 and 2, an ink jet recording apparatus (hereinafter simply referred to as the recording apparatus 1), which is an example of the recording apparatus 1 of the present embodiment, is configured as a so-called line-type recording apparatus that performs printing by ejecting ink while transporting a paper sheet S as a recording medium.

Each drawing, including FIG. 1, is illustrated using an XYZ coordinate system for convenience of explanation. The Z direction is a direction along the vertical direction. Hereinafter, this Z direction is also referred to as the up-down direction Z. The Y direction intersects the up-down direction Z (orthogonal in the present embodiment) and coincides with a width direction of the paper sheet S as a recording medium. Hereinafter, this Y direction is also referred to as the width direction Y or the left-right direction Y. The X direction is a direction that intersects (orthogonal in the present embodiment) both the up-down direction Z and the width direction Y. Hereinafter, this X direction is also referred to as the front-rear direction X. Further, in the illustrated XYZ coordinate system, the arrow direction is the plus (+) direction, and the direction opposite to the arrow is the minus (−) direction.

In the front-rear direction X, a transport direction F of the paper sheet S is the +X direction or the front direction, and the −X direction is the rear direction. When the recording apparatus 1 is viewed from the front direction (+X direction), in the width direction Y, the +Y direction is the right direction and the −Y direction is the left direction. In the up-down direction Z, the +Z direction is the upward direction, and the −Z direction is the downward direction.

Further, in the present embodiment, the case where the respective directions (X, Y, Z) are orthogonal to each other is exemplified, but the present disclosure is not necessarily limited to this.

The recording apparatus 1 includes an apparatus main body 4, an ink ejecting head (hereinafter referred to as the head unit 5), an ink storing portion 6 such as an ink tank that stores ink as a liquid, and a first transport unit 7 and a second transport unit 8 that transport the paper sheet S.

The head unit 5 as a recording unit that records on the paper sheet S extends along the width direction Y. In the present embodiment, the head unit 5 includes a plurality of head main bodies 50 that eject ink and a unit base 51 that holds the plurality of head main bodies 50 (refer to FIG. 3).

The ink storing portion 6 supplies ink to the head unit 5 and is fixed to the apparatus main body 4 in this embodiment. Ink from the ink storing portion 6 fixed to the apparatus main body 4 is supplied to the head unit 5 via supply pipes 6*a* such as tubes.

The first transport unit 7 is provided at the rear of the head unit 5. Further, in the present embodiment, in the front-rear direction X, the upstream of the head unit 5 in the transport direction F is to the rear, and the downstream is to the front.

The first transport unit 7 includes a first transport roller 71 and a first driven roller 72 that is driven by the first transport roller 71, and pinches the paper sheet S to be transported. The first transport roller 71 is rotated by the driving force of a first drive motor 73 to push the paper sheet S in the transport direction F.

The second transport unit 8 includes a transport belt 81, a second drive motor 82, a second transport roller 83, a second driven roller 84, a tension roller 85, and pressing rollers 87.

The second transport roller 83 of the second transport unit 8 is driven by the driving force of the second drive motor 82. The transport belt 81 is an endless belt, and is hung on the outer periphery of the second transport roller 83 and the second driven roller 84. The transport belt 81 such as that described above is provided below the paper sheet S. The tension roller 85 is provided between the second transport roller 83 and the second driven roller 84, contacts the inner peripheral surface of the transport belt 81, and tension is applied to the transport belt 81 by the urging force of an urging member 86 such as a spring. Accordingly, the surface of the transport belt 81 that faces the head unit 5 between the second transport roller 83 and the second driven roller 84 is disposed so as to be flat.

The pressing rollers 87 of the second transport unit 8 are provided at the front and the rear of the head unit 5 and above the paper sheet S. By holding the paper sheet S between the two pressing rollers 87 and the transport belt 81, the attitude of the paper sheet S is maintained flat.

In the recording apparatus 1 such as that described above, printing is performed by ejecting ink from each of the head main bodies 50 of the head unit 5 while transporting the paper sheet S from the rear of the head unit 5 to the front of the head unit 5 by the first transport unit 7 and the second transport unit 8, and by causing the ejected ink to land on the upper surface of the paper sheet S.

The head unit 5 of the present embodiment includes the plurality of head main bodies 50 and the unit base 51 that holds the plurality of head main bodies 50.

As illustrated in FIG. 4, each of the head main bodies 50 has a nozzle surface 502 having a nozzle opening 501 on a lower surface. The nozzle opening 501 is fixed so that a nozzle array is inclined with respect to the X direction in the in-plane direction of the nozzle surface 502. That is, the parallel direction of the nozzle opening 501 forming the nozzle array is a direction inclined with respect to the X direction. In addition, a plurality of nozzle arrays are arranged in the width direction Y on the nozzle surface 502.

In addition, each of the head main bodies 50 has a substantially parallelogram shape along the X direction and a direction inclined with respect to the Y direction when viewed from the nozzle surface 502 side. Further, the shape of the head main body 50 when viewed from the nozzle surface 502 side is not limited to a substantially parallelogram shape, and may be a rectangular shape, a trapezoidal shape, a polygonal shape, or the like. In addition, a plurality of head main bodies 50 such as those described above are fixed to the unit base 51. In the present embodiment, six head main bodies 50 are fixed to the unit base 51.

Inside the head main bodies 50, there are provided liquid flow paths (not illustrated) that communicate with the nozzle openings 501 and piezoelectric actuators (not illustrated) that cause a pressure change in the ink in the liquid flow paths. The head main bodies 50 change the volume of the liquid flow paths by deformation of the piezoelectric actuators, thereby causing a pressure change in the ink in the liquid flow paths, and ejecting ink droplets from the nozzle openings 501 toward the paper sheet S.

As illustrated in FIGS. 3 and 4, the recording apparatus 1 of the present embodiment includes the frame 100 as a multi-layer steel plate and side surface holding portions 41 and 42 that hold the head unit 5. The side surface holding portions 41 and 42 respectively hold the end portions of the head unit 5 in the width direction Y and extend downward.

The frame 100 is formed in a flat sheet shape that extends in a direction along the head unit 5 (the direction along the width direction Y), and fixes the lower end portions of the side surface holding portions 41 and 42. In other words, the frame 100 forms a support member that supports the head unit 5. Further, the side surface holding portions 41 and 42 form a portion of the apparatus main body 4.

As illustrated in FIGS. 3 and 4, members which form the second transport unit 8 illustrated in FIGS. 1 and 2 are located in a space surrounded by the head unit 5, the side surface holding portions 41 and 42, and the frame 100, and are partially fixed to the side surface holding portions 41 and 42.

Figure 5:
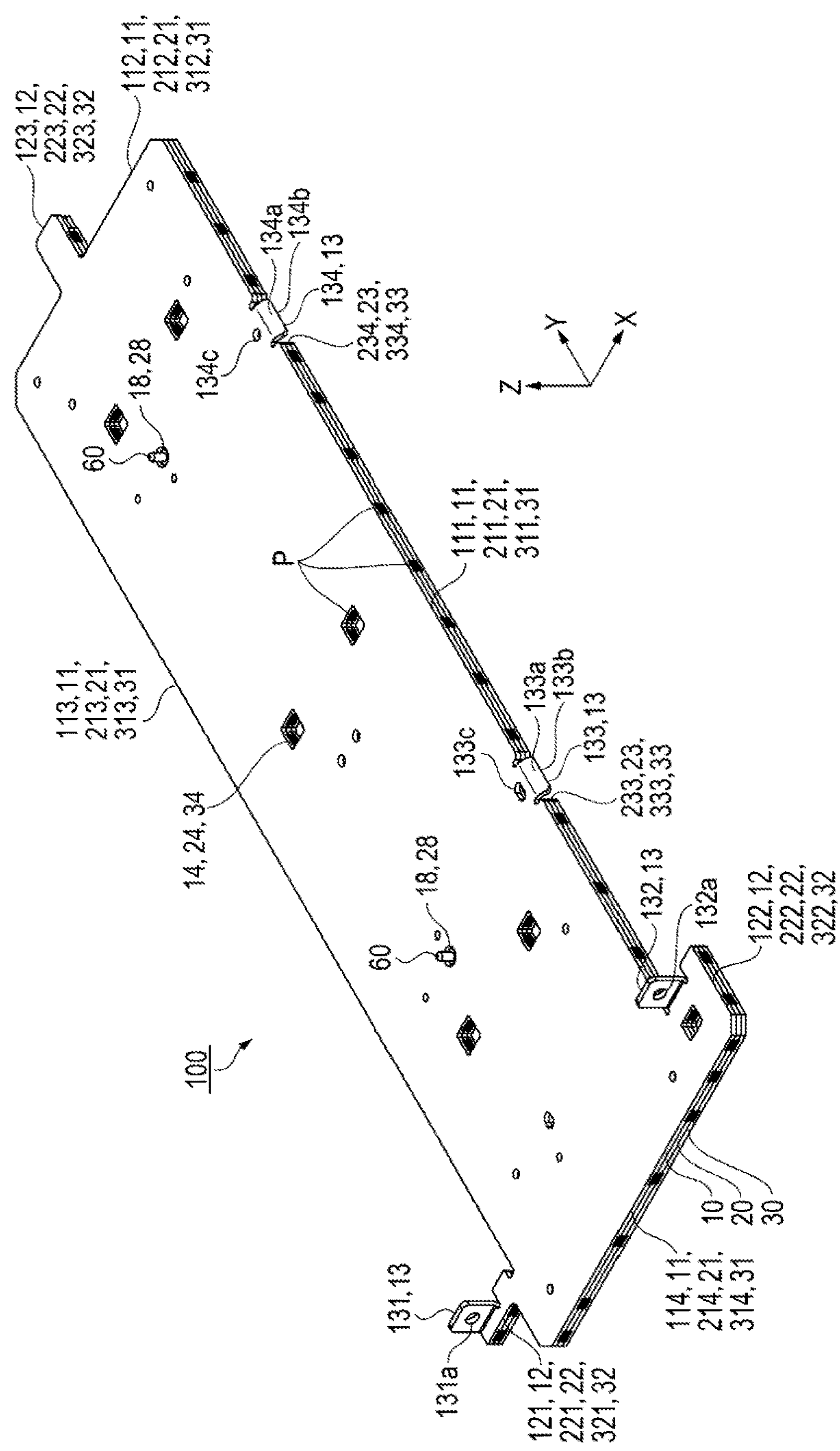
FIG. 5 is a perspective view illustrating the frame of the present embodiment.
Figure 6:
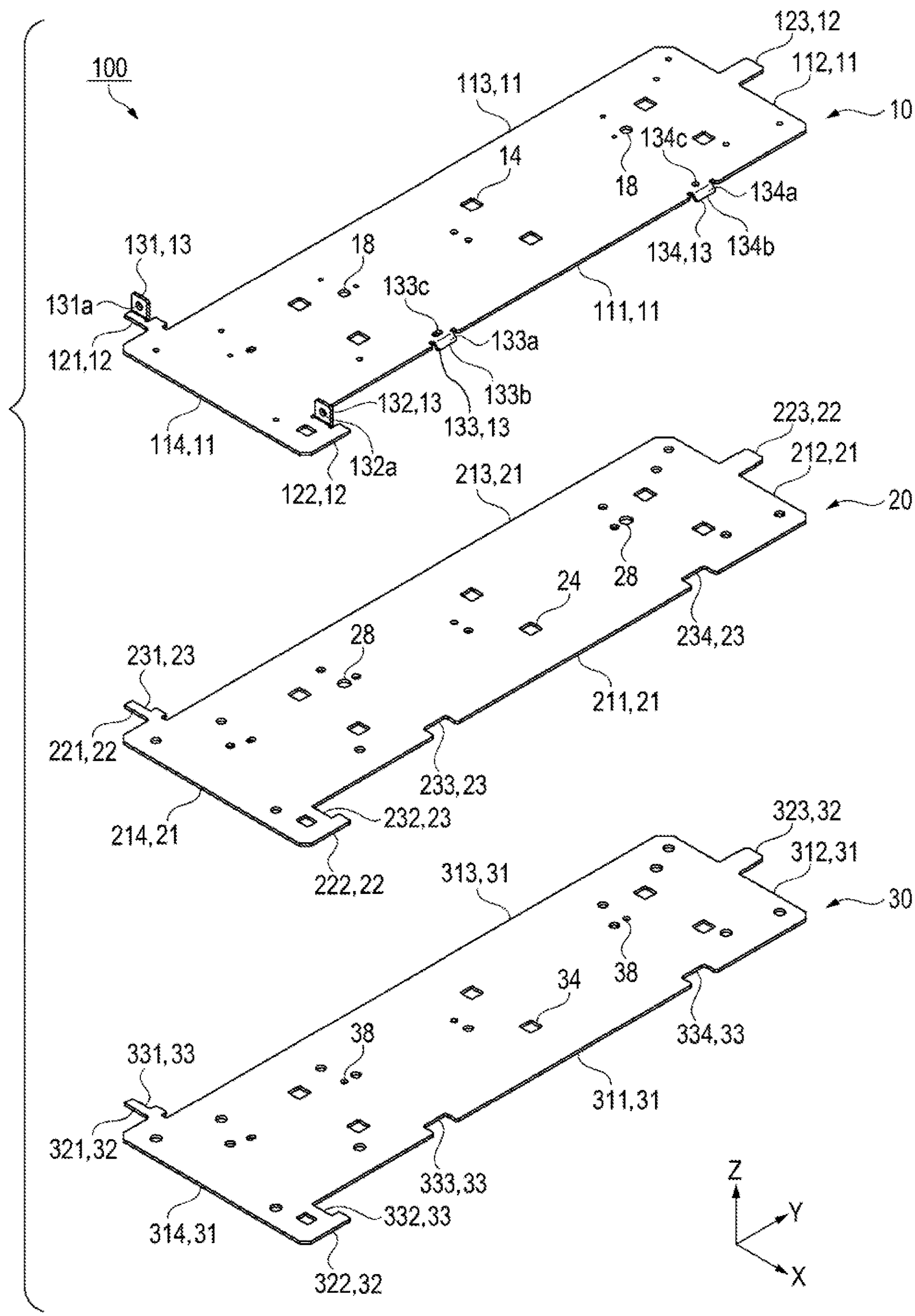
FIG. 6 is a perspective view illustrating three steel plates forming the frame.

FIG. 5 is a perspective view illustrating the frame 100 of the present embodiment. FIG. 6 is a perspective view illustrating three steel plates (a first steel plate 10, a second steel plate 20, and a third steel plate 30) forming the frame 100. A configuration of the frame 100 of the present embodiment will be described.

The frame 100 of the present embodiment is formed as a multi-layer steel plate. The frame 100 is formed of three plates including the first steel plate 10, the second steel plate 20, and the third steel plate 30 that are thin steel plates. In other words, the frame 100 has a three-layer structure including the first steel plate 10, the second steel plate 20, and the third steel plate 30. As illustrated in FIGS. 5 and 6, with respect to the three-layer steel plate, the first steel plate 10, the second steel plate 20, and the third steel plate 30 are arranged from above (+Z direction) to below (−Z direction). Hereinafter, for convenience of explanation, the first steel plate 10, the second steel plate 20, and the third steel plate 30 may be abbreviated as the steel plate 10, the steel plate 20, and the steel plate 30 in some cases.

In this embodiment, the thicknesses of the first steel plate 10, the second steel plate 20, and the third steel plate 30 are the same plate thickness of 2 mm. In addition, an electrogalvanized steel plate (SECC) is used as the material of the first steel plate 10, the second steel plate 20, and the third steel plate 30 of this embodiment. Further, the first steel plate 10, the second steel plate 20, and the third steel plate 30 are formed in one frame 100 after being stacked in three layers and then coupled by welding. Further, the welding will be described later.

The outer peripheries of the first steel plate 10, the second steel plate 20, and the third steel plate 30 of this embodiment are formed in substantially square shapes, and are formed with a plurality of sides, such as generally four sides and other sides due to differences in the shapes of the outer peripheries. When the positions of the sides of the outer peripheries of the first steel plate 10, the second steel plate 20, and the third steel plate 30 are observed in plan view from above, the steel plates include portions located at the same positions and overall have substantially the same outer shape.

In the present embodiment, the second steel plate 20 and the third steel plate 30 are formed to have substantially the same outer shape. The outer shape of the first steel plate 10 is substantially the same shape as the second steel plate 20 and the third steel plate 30, but is formed in a slightly different shape. In other words, among the plurality (three) of steel plates, one steel plate (the first steel plate 10) is processed into a shape different from that of the other steel plates (the second steel plate 20 and the third steel plate 30).

The first steel plate 10 is generally formed in a quadrangular shape, and, with respect to four sides 11, a first side 111 is to the front (+X direction), a second side 112 is to the right (+Y direction), a third side 113 is to the rear (−X direction), and a fourth side 114 is to the left (−Y direction).

In the same way, the second steel plate 20 is generally formed in a quadrangular shape, and, with respect to four sides 21, a first side 211 is to the front (+X direction), a second side 212 is to the right (+Y direction), a third side 213 is to the rear (−X direction), and a fourth side 214 is to the left (−Y direction).

In the same way, the third steel plate 30 is generally formed in a quadrangular shape, and, with respect to four sides 31, a first side 311 is to the front (+X direction), a second side 312 is to the right (+Y direction), a third side 313 is to the rear (−X direction), and a fourth side 314 is to the left (−Y direction).

In this case, the first sides 111, 211, and 311, the second sides 112, 212, and 312, the third sides 113, 213, and 313, and the fourth sides 114, 214, and 314, which correspond to the sides 11, 21, and 31 of each of the steel plates 10, 20, and 30, respectively, are located at the same positions in plan view from above.

Protruding portions 12, 22, and 32 that are disposed outside the sides 11, 21, and 31 are formed on the steel plates 10, 20, and 30. The protruding portions 12, 22, and 32 are formed as follows. First protruding portions 121, 221, and 321 that protrude in the rear direction are formed at the left end portions of the third sides 113, 213, and 313, respectively. In addition, second protruding portions 122, 222, and 322 that protrude in the front direction are formed at the left end portions of the first sides 111, 211, and 311, respectively. In addition, third protruding portions 123, 223, and 323 that protrude in the right direction (+Y direction) are formed at substantially central positions of the second sides 112, 212, and 312, respectively.

In this case, the first protruding portions 121, 221, and 321, the second protruding portions 122, 222, and 322, and the third protruding portions 123, 223, and 323, which correspond to the protruding portions 12, 22, and 32 of the steel plates 10, 20, and 30, respectively, are located at the same positions in plan view from above.

In addition, the steel plates 10, 20, and 30 are respectively formed with seven through holes 14, seven through holes 24, and seven through holes 34 that penetrate the steel plates 10, 20, and 30, respectively, at an equal pitch. The through holes 14, 24, and 34 are each formed in the same rectangular shape. The through holes 14, 24, and 34 are located at the same position where the hole shapes coincide with each other in plan view from above, and serve as common openings that penetrate the steel plates 10, 20, and 30.

In the present embodiment, after overlapping the steel plates 10, 20, and 30, welding is performed at sections (outer peripheral surfaces) of the outer peripheries where the sides 11, 21, and 31 and the protruding portions 12, 22, and 32, which are located at the same positions in plan view, overlap. In addition, welding is performed on inner peripheral sections (inner circumferential surfaces) where the through holes 14, 24, and 34 overlap. The steel plates 10, 20, and 30 are fixed to each other by this welding. Thereby, the three steel plates 10, 20, and 30 become one multi-layer steel plate, and the frame 100 is formed.

In FIG. 5, the welding points P of the outer peripheral surfaces of the sides 11, 21, and 31 and the protruding portions 12, 22, and 32 and the inner peripheral surfaces of the through holes 14, 24, and 34 are illustrated by rectangular solids. In the present embodiment, welding is performed at these welding points P. The welding points P are provided at a predetermined pitch.

Further, in the present embodiment, as described above, in addition to welding the outer peripheral surfaces of the sides 11, 21, and 31 and the protruding portions 12, 22, and 32, by welding the inner peripheral surfaces of the through holes 14, 24, and 34, rising in the thickness direction (up-down direction Z) inside the frame 100 is suppressed. In addition, when welding, by pressing on a flat surface of the three steel plates 10, 20, and 30 stacked on one another from the up-down direction Z of the steel plates 10, 20, and 30, even when the thin steel plates have a warp, the thin steel plates can be welded together while ensuring flatness.

In this embodiment, as welding, irradiation is performed in a state in which a laser beam is used as a heat source and the laser beam is focused at predetermined portions of the outer peripheral surfaces and inner peripheral surfaces of the steel plates 10, 20, and 30, and laser welding is performed in which the steel plates 10, 20, and 30 are welded by locally melting and solidifying the steel plates 10, 20, and 30. Specifically, fiber laser welding is performed as laser welding. Further, the welding is not restricted to fiber laser welding, and welding using any of various types of laser welding may be performed.

The steel plates 10, 20, and 30 are externally shaped by punching with a press machine, and bent portions 13 described later are bent with a bending machine. In addition, at the time of welding, the outer peripheral surfaces and the inner peripheral surfaces are welded in a state where the steel plates 10, 20, and 30 are pressed by a press machine. As described above, it is not necessary to perform treatment for preventing rust on the steel plates 10, 20, and 30 as a surface treatment after processing.

Figure 7:
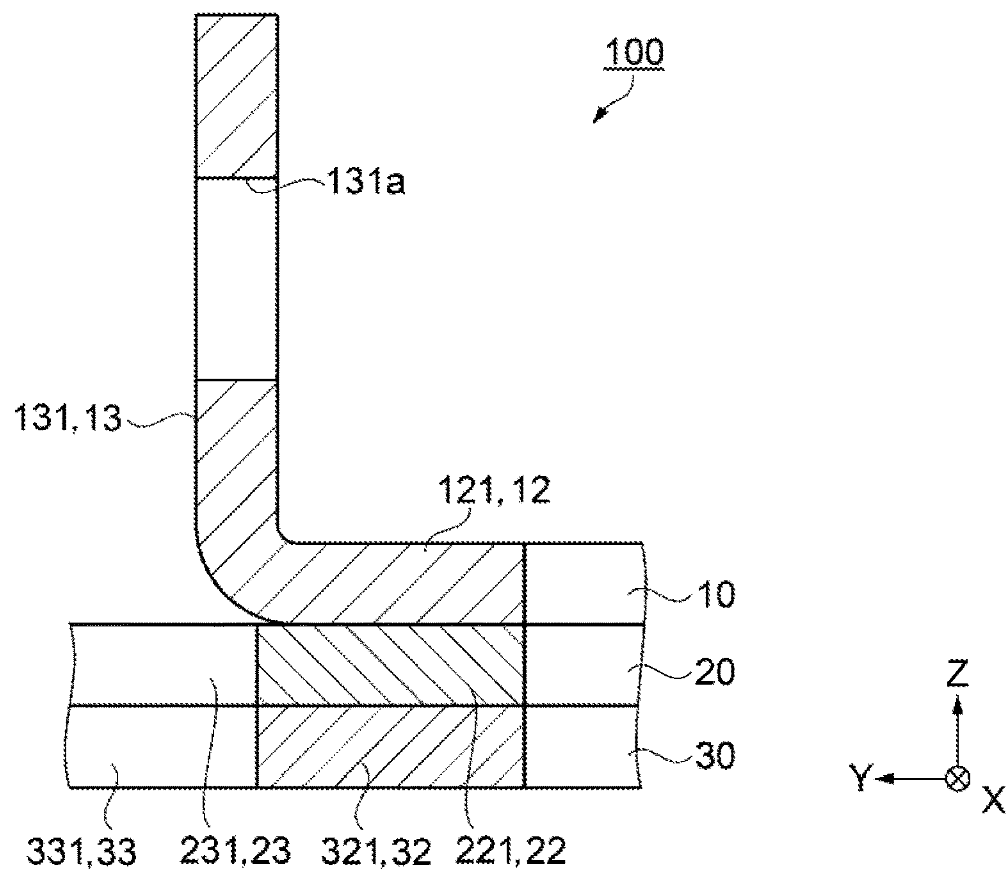
FIG. 7 is a cross-sectional view illustrating a first bent portion.
Figure 8:
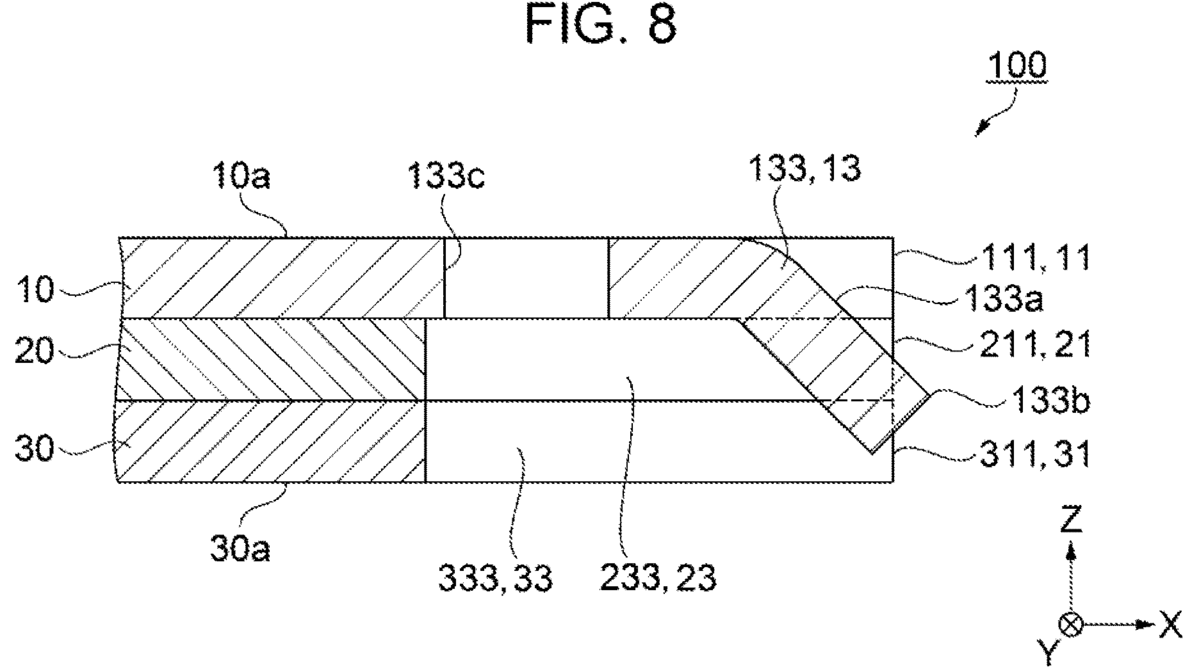
FIG. 8 is a cross-sectional view illustrating a third bent portion.
Figure 9:
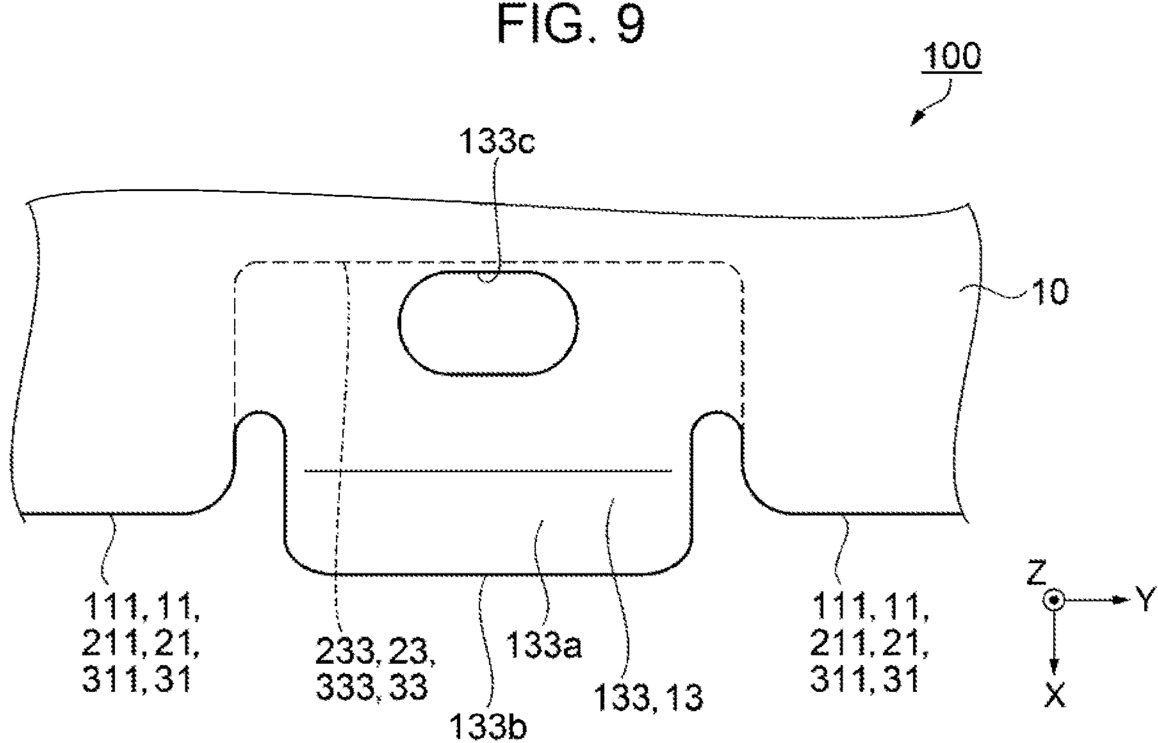
FIG. 9 is a plan view of the third bent portion as viewed from above.

FIG. 7 is a cross-sectional view illustrating a first bent portion 131. FIG. 7 illustrates a state in which the first bent portion 131 is cut along the YZ plane as a cross-sectional view seen from the −X direction. FIG. 8 is a cross-sectional view illustrating a third bent portion 133. FIG. 8 illustrates a state in which the third bent portion 133 is cut along the XZ plane as a cross-sectional view seen from the −Y direction. FIG. 9 is a plan view of the third bent portion 133 as viewed from above.

In the steel plate 10, the plurality of bent portions 13 that are processed into different shapes from the steel plates 20 and 30 are formed by being bent in the thickness direction (up-down direction Z). Specifically, as illustrated in FIGS. 5 to 7, the first bent portion 131 that is bent and that extends upward is formed in the steel plate 10 to the right (+Y direction) on the distal end side of the first protruding portion 121. Further, a hole 131*a* is formed in the center of the surface of the first bent portion 131. Similarly, a second bent portion 132 that is bent and that extends upward is formed in the steel plate 10 on the first side 111 side to the right (+Y direction) of the second protruding portion 122. Further, a hole 132*a* is formed in the center of the surface of the second bent portion 132. The first bent portion 131 and the second bent portion 132 are formed in substantially the same form.

In the present embodiment, the hole 131*a* formed in the first bent portion 131 and the hole 132*a* formed in the second bent portion 132 are formed as fixing holes for fixing the side surface holding portion 42 that holds the head unit 5. The holes 131*a* and 132*a* of the present embodiment are formed as holes through which fixing screws as fastening members are inserted when the side surface holding portion 42 is to be fixed.

Further, the holes 131*a* and 132*a* may be formed as threaded holes, or may be formed as tap holes. In addition, the holes 131*a* and 132*a* are formed as reference holes and reference protrusions formed on a fixing member to be fixed may be inserted therein.

On the outer periphery of the first side 111 of the steel plate 10, as illustrated in FIGS. 5, 6, 8, and 9, from a portion on the inner side of the outer periphery, the third bent portion 133 is formed that extends in the front direction and is bent and extends downward. Further, the third bent portion 133 has an inclined surface 133*a* that is inclined downward. In addition, on the outer periphery of the first side 111 of the steel plate 10, in the right direction (+Y direction) from the third bent portion 133, from a portion on the inner side of the outer periphery, a fourth bent portion 134 is formed that extends in the front direction and is bent and extends downward. Further, the fourth bent portion 134 has an inclined surface 134*a* that is inclined downward. The third bent portion 133 and the fourth bent portion 134 are formed in the same shape.

As illustrated in FIGS. 5 to 7, first recessed portions 231 and 331 are disposed (formed) as recessed portions 23 and 33 recessed inward in the portions of the steel plates 20 and 30 corresponding to the first bent portion 131 of the steel plate 10. In addition, similarly, in the portions of the steel plates 20 and 30 corresponding to the second bent portion 132 of the steel plate 10, as illustrated in FIGS. 5, 6, 8 and 9, second recessed portions 232 and 332 are formed as the recessed portions 23 and 33 recessed inward.

As illustrated in FIGS. 5, 6, 8, and 9, in the portions of the steel plates 20 and 30 corresponding to the third bent portion 133 of the plate 10, third recessed portions 233 and 333 are arranged inside the first sides 211, and 311, respectively, and are formed as the recessed portions 23 and 33 that are recessed inward. In addition, similarly, as illustrated in FIGS. 5 and 6, in the portions of the steel plates 20 and 30 corresponding to the fourth bent portion 134 of the steel plate 10, fourth recessed portions 234 and 334 are disposed inside the first sides 211 and 311, respectively, and are formed as the recessed portions 23 and 33 that are recessed inward.

As illustrated in FIGS. 8 and 9, the third bent portion 133 of the first steel plate 10 of the present embodiment is bent downward to near a surface 30*a* of the third steel plate 30 (the bottom surface of the frame 100), which corresponds to about the same position (same height) as the third steel plate 30 in the thickness direction (up-down direction Z). Accordingly, the inclined surface 133*a* is partially disposed in the third recessed portions 233 and 333 in the left-right direction Y and the up-down direction Z. In addition, a distal end portion 133*b* of the third bent portion 133 extends in the front direction from the first side 111.

Similarly to the third bent portion 133, the fourth bent portion 134 is also bent downward to near the surface 30*a* of the third steel plate 30, which corresponds to about the same position (the same height) as the third steel plate 30 in the thickness direction (up-down direction Z). Therefore, the inclined surface 134*a* is disposed in the fourth recessed portions 234 and 334 in the left-right direction Y and the up-down direction Z. In addition, a distal end portion 134*b* of the fourth bent portion 134 extends in the front direction from the first side 111.

Here, on the inner side (−X direction) of the third bent portion 133 of the first steel plate 10, a hole 133*c* serving as a long hole in the left-right direction Y is formed. In addition, a hole 134*c* serving as a round hole is formed on the inner side (−X direction) of the fourth bent portion 134. Portions of the steel plates 20 and 30 corresponding to the hole 133*c* are formed with the third recessed portions 233 and 333, respectively, and there is a space in the downward direction from the hole 133*c*. In addition, portions of the steel plates 20 and 30 corresponding to the hole 134*c* are formed with the fourth recessed portions 234 and 334, respectively, and there is a space in the downward direction from the holes 134*c*. The holes 133*c* and 134*c* are holes that are processed only in the first steel plate 10.

As illustrated in FIG. 8, the holes 133*c* and 134*c* function as reference holes for guiding a fixing member (not illustrated) that is to be placed and fixed on a surface 10*a* of the first steel plate 10 that is the upper surface of the frame 100. In the present embodiment, detailed description is omitted, but the fixing member has two reference protruding portions (not illustrated) on a lower surface that corresponds to the side in contact with the surface 10*a*. At the time of assembly, the operator inserts the two protruding portions into the holes 133*c* and 134*c* while moving the fixing member from the front side to the rear side of the frame 100 at a position in the height direction of the frame 100.

Further, when moving the fixing member, the operator brings the two protruding portions into contact with the inclined surface 133*a* of the third bent portion 133 and the inclined surface 134*a* of the fourth bent portion 134. Then, the operator can insert the protruding portions into the holes 133*c* and 134*c* by moving the protruding portions along the inclined surfaces 133*a* and 134*a* while sliding upward. Thus, the inclined surfaces 133*a* and 134*a* of the present embodiment have a function of guiding the movement of other fixing members from the front direction. Further, when the inclined surfaces 133*a* and 134*a* are not formed, the two protrusions hit the end surfaces of the first sides 111, 211, and 311 and it is difficult to insert the two protrusions into the holes 133*c* and 134*c*.

Further, when using an existing thick steel plate, in forming the inclined surfaces 133*a* and 134*a*, a cutting process for cutting the surface of the steel plate has been performed. In this case, a surface treatment for preventing rust, or the like, is performed after the processing. However, in this embodiment, since the inclined surfaces 133*a* and 134*a* can be formed by bending a thin steel plate, surface treatment after processing is not necessary.

Figure 10:
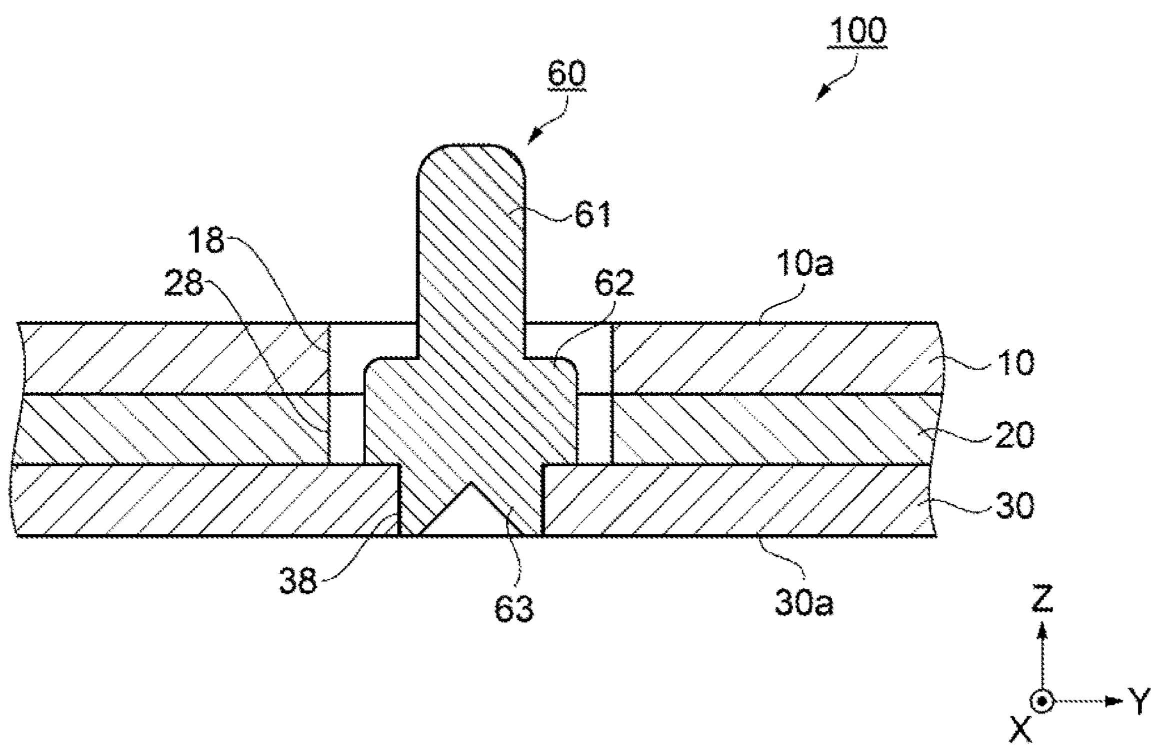
FIG. 10 is a cross-sectional view illustrating a state in which a shaft pin is installed in the frame.

FIG. 10 is a cross-sectional view illustrating a state in which a shaft pin 60 is installed in the frame 100.

In this embodiment, as illustrated in FIGS. 5, 6, and 10, two shaft pins 60 are installed in the frame 100. The shaft pins 60 are used as reference pins for positioning a fixing member (not illustrated) that is to be fixed to the frame 100 from above.

Each of the shaft pins 60 includes a shaft portion 61, a step portion 62, and a head portion 63. In addition, shaft holes 18, 28, and 38, which are round holes, are formed in the steel plates 10, 20, and 30, respectively. Further, the shaft hole 18 of the steel plate 10 and the shaft hole 28 of the steel plate 20 are formed with the same inner diameter and have an inner diameter larger than the step portion 62 of the shaft pin 60. In addition, the shaft hole 38 of the steel plate 30 has an inner diameter that is slightly larger than the outer shape of the head portion 63. Further, the inner diameters of the shaft holes 18 and 28 are larger than the inner diameter of the shaft hole 38.

The method of installing the shaft pin 60 in the frame 100 (the steel plate 30) is performed using a jig. The head portion 63 is inserted into the shaft hole 38 of the steel plate 30 from above the steel plate 30, and the lower surface of the step portion 62 is positioned on the upper surface around the shaft hole 38. Thereafter, by supporting the step portion 62 and hitting the head portion 63 from below, the head portion 63 is plastically deformed and widens the shaft diameter. Thereby, the shaft pin 60 is fixed to the steel plate 30 by filling a slight clearance between the head portion 63 and the shaft hole 38. In the present embodiment, the shaft pin 60 is fixed to the shaft hole 38 by so-called caulking.

Further, in the state where the shaft pin 60 is fixed to the steel plate 30, a gap is secured between the shaft holes 18 and 28 and the shaft portion 61. With such fixing, the shaft pin 60 (the shaft portion 61) protruding upward from the steel plate 10 does not contact the surface 10*a* of the steel plate 10, and there is no deformation (swelling) or the like of the surface 10*a* when the outer periphery of the shaft portion 61 comes in contact with the surface 10*a*. Thereby, the perpendicularity to the surface 10*a* can be secured, and the fixing member to be fixed does not need to have a shape that allows the opening distal end portion of the shaft hole through which the shaft portion 61 is inserted to deviate from the shaft portion 61. With this configuration, the shaft pin 60 can be formed as a reference shaft pin.

As described above, according to the recording apparatus 1 according to the present embodiment, the following effects can be obtained.

In the present embodiment, the frame 100 is formed as a multi-layer steel plate in which three thin steel plates are stacked on one another. The outer peripheries of the three steel plates 10, 20, and 30 have a plurality of sides, and the frame 100 is fixed at the outer peripheral surfaces of the sides 11, 21, and 31 located at the same positions in plan view by welding the steel plates 10, 20, and 30 one another. Further, of the three steel plates 10, 20, and 30, the steel plate 10 is processed into a shape different from that of the other steel plates 20 and 30. Thereby, the frame 100 can ensure a high rigidity similar to a thick steel plate without using an existing thick steel plate by stacking thin steel plates and forming a multi-layer steel plate by welding. In addition, since the steel plate 10, which is thin, can be processed into a shape different from that of the other steel plates 20 and 30, compared with a case where an existing thick steel plate is processed, complex and highly accurate processing can be easily performed.

In the present embodiment, the three steel plates 10, 20, and 30 forming the frame 100 are formed with the third protruding portions 123, 223, and 323, which are common to each other, disposed outside the second sides 112, 212, and 312, and are also fixed by welding the outer peripheral surfaces of the third protruding portions 123, 223, and 323. Thereby, the rigidity of the third protruding portions 123, 223, and 323 can be secured. Further, the first protruding portions 121, 221, and 321 and the second protruding portions 122, 222, 322 can similarly secure rigidity.

In the present embodiment, the three steel plates 10, 20, and 30 are provided with the through holes 14, 24, and 34, thereby forming common openings that penetrate the three steel plates 10, 20, and 30. Then, the openings are fixed by welding the insides (inner peripheral surfaces) of the openings (the through holes 14, 24, and 34). As a result, in addition to welding the outer peripheral surfaces of the frame 100 such as the sides 11, 21, and 31 and the protruding portions 12, 22, and 32, by welding the inner peripheral surfaces of the through holes 14, 24, and 34, it is possible to prevent lifting in the thickness direction (up-down direction Z) inside the frame 100.

In the present embodiment, unlike the steel plates 20 and 30, the steel plate 10 has the bent portions 13 bent in the thickness direction. Thereby, compared with processing bent portions using an existing thick steel plate, it is possible to perform processing of the bent portions 13 that are complex and highly accurate.

In this embodiment, the third bent portion 133 and the fourth bent portion 134 of the steel plate 10 are bent to the same position (same height) as the steel plate 30 in the thickness direction. Thereby, the third bent portion 133 and the fourth bent portion 134 have bent portions provided within the plate thickness of the frame 100, and the bent portions can be formed compactly.

In this embodiment, the third bent portion 133 and the fourth bent portion 134 have the inclined surfaces 133*a* and 134*a*. Thereby, assembly can be facilitated by utilizing the inclined surfaces 133*a* and 134*a*. In addition, since the distal end portions 133*b* and 134*b* of the inclined surfaces 133*a* and 134*a* extend farther out toward the front direction than the first side 111, the inclination of the inclined surfaces 133*a* and 134*a* can be relaxed, and the fixing member that is to be moved from the front to the rear can be stably guided.

In the present embodiment, the steel plates 20 and 30 are formed with the third recessed portions 233 and 333 and the fourth recessed portions 234 and 334 arranged inside the sides, and the inclined surfaces 133*a* and 134*a* of the steel plate 10 are respectively disposed in the third recessed portions 233 and 333 and the fourth recessed portions 234 and 334 in the left-right direction Y and the up-down direction Z. Accordingly, the inclined surfaces 133*a* and 134*a* can be formed compactly in the plane direction (XY plane) and the thickness direction (YZ plane).

In the present embodiment, the holes 131*a* and 132*a* are disposed in the first bent portion 131 and the second bent portion 132. Thereby, the side surface holding portion 42 can be fixed by fastening members, such as screws, via the holes 131*a* and 132*a*.

In the present embodiment, the frame 100 has a three-layer structure in which three thin steel plates are stacked on one another. Two layers corresponding to the steel plates 20 and 30 have the same shape, and one layer corresponding to the steel plate 10 that is an outer layer is processed into a shape different from that of the steel plates 20 and 30 that correspond to the other two layers. Thereby, when processing the three steel plates 10, 20, and 30, the steel plates 20 and 30 can be processed into a common shape, so that the cost for processing can be reduced.

In this embodiment, by giving the steel plates 10, 20, and 30 of the three-layer structure the same plate thickness (thickness 2 mm), the processing cost can be further reduced. In addition, in the present embodiment, by using the same material (SECC), the processing cost can be further reduced.

In the present embodiment, the recording apparatus 1 includes the head unit 5 that prints on the paper sheet S. In addition, the frame 100 forms a support member that supports the head unit 5. As a result, by easily performing complex and highly accurate processing on the frame 100 formed of a multi-layer steel plate to secure high rigidity, the recording apparatus 1 with high rigidity and high accuracy can be realized, and printing quality can be maintained.

Further, the present disclosure is not limited to the above described embodiment, and various modifications, improvements or the like can be made to the above embodiment. Modification examples are described below.

Modification 1

As for the steel plates 10, 20, and 30 forming the frame 100 of the present embodiment, the plate thickness is 2 mm and the material used is SECC. However, the present disclosure is not limited to this, and the plate thickness may be appropriately selected from the thicknesses of a plurality of types of thin steel plates. In addition, the material may be appropriately selected from a plurality of types. In addition, in the present embodiment, the steel plates 10, 20, and 30 have the same thickness and are formed of the same material; however, the thickness and material of the steel plates may be different for each steel plate (each layer).

Modification 2

In the frame 100 of the present embodiment, the third bent portion 133 and the fourth bent portion 134 of the first steel plate 10 are bent to the same height as the third steel plate 30 in the thickness direction. However, the present disclosure is not restricted to this, the third bent portion 133 and the fourth bent portion 134 may be formed so as to extend below the surface 30*a* of the third steel plate 30 in the thickness direction.

Modification 3

In the frame 100 of the present embodiment, the bent portions 13 (the first bent portion 131 and the like) are formed only on the first steel plate 10. However, in a multi-layer steel plate, the bent portions may be formed extending from any steel plate. In addition, the angle and direction of bending of the bent portions are also unrestricted. In any case, since the bent portions can be easily formed as necessary, the degree of freedom in processing can be improved as compared with the case of using a thick steel plate as in the past.

Modification 4

In the frame 100 of the present embodiment, the first steel plate 10 is processed into a shape different from that of the second steel plate 20 and the third steel plate 30. However, the present disclosure is not limited to this, and the second steel plate 20 may be processed into a shape different from that of the first steel plate 10 and the third steel plate 30, or the third steel plate 30 may be processed into a shape different from that of the first steel plate 10 and the second steel plate 20.

Modification 5

In the present embodiment, the frame 100 has a three-layer structure in which three thin steel plates are stacked on one another. Then, the two layers corresponding to the steel plates 20 and 30 have the same shape, and one layer that is an outer layer corresponds to the steel plate 10. However, the present disclosure is not limited thereto, and two layers corresponding to the steel plates 10 and 20 may have the same shape, and one layer serving as the outer layer may be formed as the steel plate 30.

Modification 6

In the present embodiment, the frame 100 has a three-layer structure in which three thin steel plates are stacked on one another. However, the present disclosure is not limited to this, and a two-layer structure in which two thin steel plates are stacked may be used, or a multilayer structure having a four-layer structure or more in which four or more thin steel plates are stacked may be used.

Modification 7

In the present embodiment, in the frame 100, the first steel plate 10 is processed into a shape different from that of the second steel plate 20 and the third steel plate 30. However, the present disclosure is not limited to this, and the first steel plate 10, the second steel plate 20, and the third steel plate 30 may be processed into different shapes. However, it is sufficient that the first steel plate 10, the second steel plate 20, and the third steel plate 30 have common sides and are welded and fixed on the outer peripheral surfaces thereof.

The contents derived from the above embodiment will be described below.

A multi-layer steel plate is a multi-layer steel plate including a plurality of steel plates being stacked, outer peripheries of which have a plurality of sides, in which positions of the plurality of sides of the plurality of steel plates include portions located at identical positions in plan view, the plurality of steel plates are fixed to each other by welding at the plurality of sides located at the identical positions in plan view, and among the plurality of steel plates, at least one of the steel plates is processed into a shape different from a shape of other steel plates.

According to this configuration, instead of using one existing steel plate (thick steel plate), a multi-layer steel plate is formed by stacking a plurality of steel plates (thin steel plates), and welding the steel plates together at a plurality of sides located at the same position in plan view. Thereby, the multi-layer steel plate can secure the same high rigidity as a thick steel plate. In addition, since one steel plate is processed into a shape different from that of the other steel plates, compared with a case of processing an existing thick steel plate, complex processing can be easily performed.

In the multi-layer steel plate, the plurality of steel plates may be formed with a protruding portion in common disposed outside the sides, and may be fixed to each other by welding at the protruding portion.

According to this configuration, even when a common protruding portion is formed outside the sides of the plurality of steel plates, the rigidity of the multi-layer steel plate can further be secured by the steel plates being welded and fixed to one another at the protruding portion.

In the multi-layer steel plate, the plurality of steel plates may have an opening in common formed therein that penetrates the plurality of steel plates, and the steel plates may be fixed to each other by welding inside the opening.

According to this configuration, even when a common opening that penetrates the plurality of steel plates is formed, the multi-layer steel plate can be prevented from being lifted in the thickness direction (up-down direction) on the inner side of the multi-layer steel plate by being fixed by welding the steel plates to one another other inside the opening.

In the multi-layer steel plate, a portion of the at least one of the steel plates processed into the different shape may have a bent portion bent in a thickness direction.

According to this configuration, by a portion of the at least one of the steel plates processed into a different shape being made to have a bent portion bent in the thickness direction, the multi-layer steel plate can be easily processed as a complex bent portion compared with processing a bent portion using an existing thick steel plate.

In the multi-layer steel plate, the bent portion may be bent up to a position identical with a position of the other steel plates in the thickness direction.

According to this configuration, the bent portion is bent to the same position as the other steel plates in the thickness direction so that the multi-layer steel plate has a bent portion provided within the plate thickness, and the bent portion is made compact.

In the multi-layer steel plate, the bent portion may have an inclined surface.

According to this configuration, by using the inclined surface, it is possible to easily assemble a fixing member or the like to the multi-layer steel plate.

In the multi-layer steel plate, except for the at least one of the steel plates, the other steel plates may have a recessed portion formed therein, the recessed portion being disposed inside the sides, and the inclined surface of the at least one of the steel plates may be disposed in the recessed portion.

According to this configuration, the multi-layer steel plate can be configured such that the inclined surface is made compact in the plane direction and the thickness direction of the steel plates by arranging the inclined surface of the steel plate in the recessed portion.

In the multi-layer steel plate, the bent portion may have a fixing hole disposed therein.

According to this configuration, a fixing member to be fixed to the multi-layer steel plate can be reliably fixed to the multi-layer steel plate by a fastening member such as a screw via the fixing hole.

In the multi-layer steel plate, the plurality of steel plates may form a three-layer structure, two layers may have an identical shape, and any one of outer layers may be processed into a shape different from the shape of the other two layers.

According to this configuration, when the multi-layer steel plate is formed by processing three steel plates, two of the steel plates can be processed into a common shape, so that the cost for processing can be reduced.

In the multi-layer steel plate, the steel plates forming the three-layer structure may have an identical thickness.

According to this configuration, since the multi-layer steel plate is formed of three steel plates having the same thickness, the processing cost can be further reduced.

A recording apparatus includes any one of the above-described multi-layer steel plates, and a recording unit that records on a recording medium, in which the multi-layer steel plate forms a support member that supports the recording unit.

According to this configuration, the recording apparatus has a recording unit that records on a recording medium. In addition, the recording apparatus is formed with a support member that supports the recording unit. As a result, the recording apparatus can ensure high rigidity with a multi-layer steel plate, and since complex processing can be easily performed with high accuracy, a recording apparatus with high rigidity and high accuracy can be realized, and recording quality can be maintained.

What is claimed is:

1. A multi-layer steel plate comprising:

a plurality of steel plates being stacked, outer peripheries of which have a plurality of sides, wherein positions of the plurality of sides of the plurality of steel plates include portions located at identical positions in plan view, the plurality of steel plates are fixed to each other by welding at the plurality of sides located at the identical positions in plan view, among the plurality of steel plates, at least one of the steel plates is processed into a shape different from a shape of other steel plates of the plurality of steel plates, a portion of the at least one of the steel plates processed into the different shape has a bent portion bent in a thickness direction, each of the plurality of steel plates are formed with a protruding portion having an identical location in the thickness direction, and the bent portion is bent up in the thickness direction on the protruding portion of the at least one of the steel plates.

2. The multi-layer steel plate according to claim 1, wherein the plurality of steel plates are fixed to each other by welding at the protruding portions of each of the steel plates.

3. The multi-layer steel plate according to claim 1, wherein the plurality of steel plates have an opening in common formed therein that penetrates the plurality of steel plates, and the steel plates are fixed to each other by welding inside the opening.

4. The multi-layer steel plate according to claim 1, wherein the bent portion has an inclined surface.

5. The multi-layer steel plate according to claim 4, wherein except for the at least one of the steel plates, the other steel plates have a recessed portion formed therein, and the inclined surface of the at least one of the steel plates is disposed in the recessed portion.

6. The multi-layer steel plate according to claim 1, wherein the bent portion has a fixing hole disposed therein.

7. The multi-layer steel plate according to claim 1, wherein the plurality of steel plates forms a three-layer structure, two layers have an identical shape, and any one of outer layers is processed into a shape different from the shape of the other two layers.

8. The multi-layer steel plate according to claim 7, wherein the steel plates forming the three-layer structure have an identical thickness.

9. A recording apparatus comprising:

the multi-layer steel plate according to claim 1; and a recording unit that records on a recording medium, wherein the multi-layer steel plate forms a support member that supports the recording unit.

10. A multi-layer steel plate comprising:

a plurality of steel plates being stacked, outer peripheries of which have a plurality of sides, wherein positions of the plurality of sides of the plurality of steel plates include portions located at identical positions in plan view, the plurality of steel plates are fixed to each other by welding at the plurality of sides located at the identical positions in plan view, among the plurality of steel plates, at least one of the steel plates is processed into a shape different from a shape of other steel plates, and a portion of the at least one of the steel plates processed into the different shape has a bent portion bent in a thickness direction, wherein the bent portion has a fixing hole disposed therein.

11. A multi-layer steel plate comprising:

a plurality of steel plates being stacked, outer peripheries of which have a plurality of sides, wherein positions of the plurality of sides of the plurality of steel plates include portions located at identical positions in plan view, the plurality of steel plates are fixed to each other by welding at the plurality of sides located at the identical positions in plan view, among the plurality of steel plates, at least one of the steel plates is processed into a shape different from a shape of other steel plates, and a portion of the at least one of the steel plates processed into the different shape has a bent portion bent in a thickness direction, wherein the plurality of steel plates forms a three-layer structure, two layers have an identical shape, and any one of outer layers is processed into a shape different from the shape of the other two layers.

* * * * *